(12) United States Patent
Bialer et al.

(10) Patent No.: US 10,018,709 B2
(45) Date of Patent: Jul. 10, 2018

(54) RADAR TARGET DETECTION VIA MULTI-DIMENSIONAL CLUSTER OF REFLECTORS

(71) Applicant: GM Global Technology Operations LLC, Detroit, MI (US)

(72) Inventors: Oded Bialer, Petah Tikva (IL); Igal Bilik, Rehovot (IL); Inna Stainvas Olshansky, Modiin (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 351 days.

(21) Appl. No.: 14/853,357

(22) Filed: Sep. 14, 2015

(65) Prior Publication Data

US 2016/0084944 A1   Mar. 24, 2016

Related U.S. Application Data

(60) Provisional application No. 62/052,714, filed on Sep. 19, 2014.

(51) Int. Cl.
*G01S 13/93* (2006.01)
*G01S 7/41* (2006.01)
*G01S 13/89* (2006.01)

(52) U.S. Cl.
CPC .............. *G01S 7/411* (2013.01); *G01S 7/414* (2013.01); *G01S 13/931* (2013.01); *G01S 13/89* (2013.01)

(58) Field of Classification Search
CPC ................................. G01S 7/411; G01S 7/414
USPC .............................................. 342/70–72, 140
See application file for complete search history.

(56) References Cited

U.S. PATENT DOCUMENTS

| | | | | |
|---|---|---|---|---|
| 6,834,232 B1 * | 12/2004 | Malhotra | ............... | G08G 1/163 340/903 |
| 7,176,830 B2 * | 2/2007 | Horibe | .................. | G01S 17/023 342/118 |
| 7,876,258 B2 * | 1/2011 | Abraham | ............... | G08G 5/045 342/140 |
| 8,044,846 B1 * | 10/2011 | Urkowitz | .............. | G01S 13/582 342/104 |
| 8,446,312 B2 * | 5/2013 | Kanamoto | ................ | G01S 3/74 342/147 |
| 8,482,457 B2 * | 7/2013 | Aizawa | .................... | G01S 13/44 342/149 |
| 8,872,693 B1 * | 10/2014 | Malas | ..................... | G01S 7/412 342/195 |
| 8,933,834 B2 * | 1/2015 | Nakanishi | ............. | G01S 13/931 342/104 |
| 2014/0035775 A1 | 2/2014 | Zeng et al. | | |

FOREIGN PATENT DOCUMENTS

CN          102221697 A      10/2011

* cited by examiner

*Primary Examiner* — Marcus E Windrich
(74) *Attorney, Agent, or Firm* — Cantor Colburn LLP

(57) ABSTRACT

A target detection system and a method of performing radar target detection are described. The system includes a radar system to obtain radar echoes from a target with multiple point reflectors. The system also includes a processor to obtain a cluster of multi-dimensional point spread function from the radar echoes, each multi-dimensional point spread function being associated with a reflection from one of the multiple point reflectors, and also to perform object detection based on three or more dimensions of each of the multi-dimensional point spread functions of the cluster.

12 Claims, 3 Drawing Sheets

RADAR TARGET DETECTION VIA MULTI-DIMENSIONAL CLUSTER OF REFLECTORS

CROSS-REFERENCE TO RELATED APPLICATION

This application is a Non-Provisional of U.S. Provisional Patent Application Ser. No. 62/052,714 filed Sep. 19, 2014, the disclosure of which is incorporated by reference herein in its entirety.

FIELD OF THE INVENTION

The subject invention relates to radar target detection via a multi-dimensional cluster of reflectors.

BACKGROUND

Radio detection and ranging (radar) systems are widely used for object detection. Generally, radar systems use radio waves to determine the range, altitude, direction, or speed of detected objects. Additional processing may be used to identify a detected object. In certain applications, a radar target may be represented as a random cluster of multiple point scatters. For example, automotive radar may detect another vehicle as a cluster of point scatters or, at a greater distance, as a single point. Each point scatter is received as a spread function with multiple dimensions. For example, the spread function may include five dimensions: range, azimuth, elevation, intensity, and Doppler. A radar echo may be represented as a cluster (superposition) of random point spread functions. Currently, radar detection and processing systems treat each of the dimensions of the spread function individually, as two-dimensional spreading functions.

Accordingly, it is desirable to provide improved detection using the multi-dimensional cluster of reflectors.

SUMMARY OF THE INVENTION

According to an exemplary embodiment, a target detection system includes a radar system configured to obtain radar echoes from a target with multiple point reflectors; and a processor configured to obtain a cluster of multi-dimensional point spread function from the radar echoes, each multi-dimensional point spread function being associated with a reflection from one of the multiple point reflectors, and also configured to perform object detection based on three or more dimensions of each of the multi-dimensional point spread functions of the cluster.

According to another embodiment, a method of performing radar target detection includes obtaining, using a radar system, radar echoes from a target with multiple point reflectors; obtaining, using a processor, a cluster of multi-dimensional point spread functions from the radar echoes, each multi-dimensional point spread function being associated with a reflection from one of the multiple point reflectors; performing object detection, using the processor, based on three or more dimensions of each of the multi-dimensional point spread functions of the cluster.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
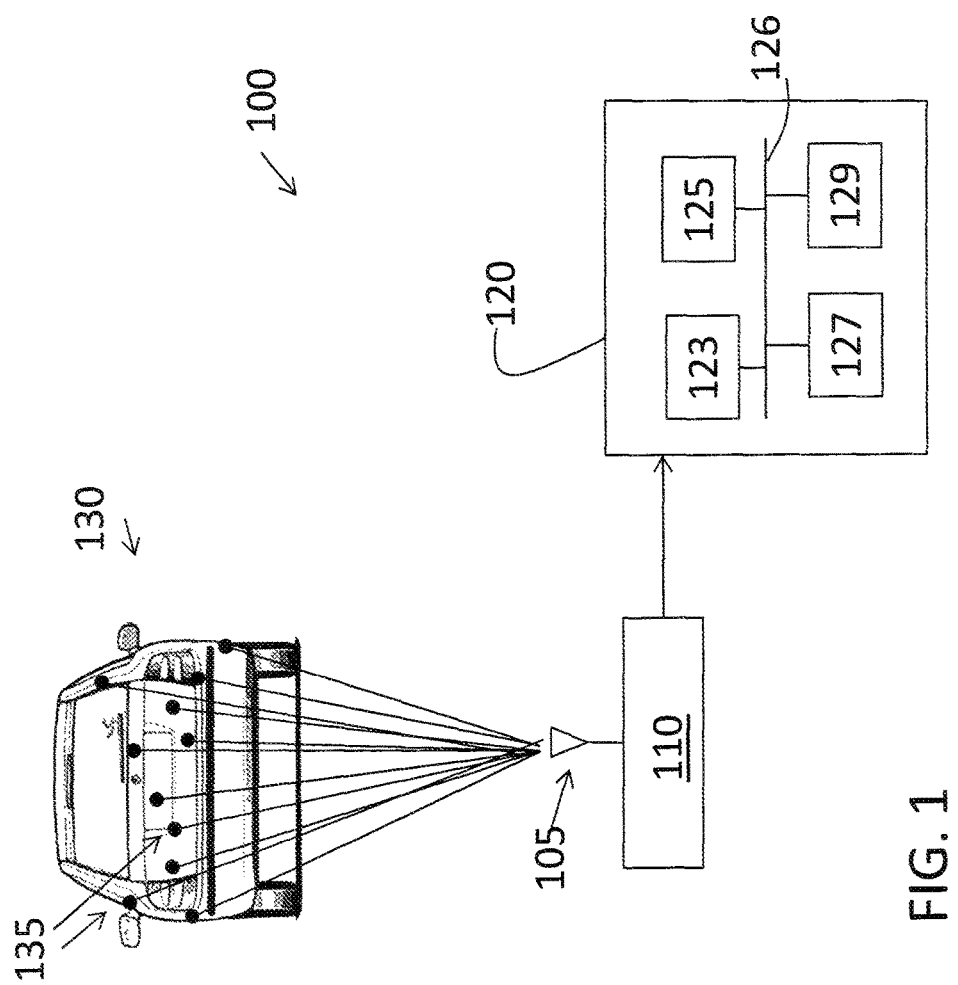
FIG. 1 is a block diagram of a target detection system according to an embodiment of the invention.

The following description is merely exemplary in nature and is not intended to limit the present disclosure, its application or uses. It should be understood that throughout the drawings, corresponding reference numerals indicate like or corresponding parts and features.

As noted above, the multi-dimensional spread function resulting from a radar return of a point reflection is currently used to detect an object by considering no more than two dimensions at once. In many cases, spread in four of the dimensions is assumed to be (nearly) fixed. This assumption may be valid, for example, when a ground-based radar system detects an airplane at a sufficient distance that the airplane looks like a point target. However, this is not the case when the target is relatively close to the radar system as in most automotive radar detection applications, for example. In addition, the inventors have found that the consideration of all of the dimensions together, rather than individually, increases the constraints on the system and decreases the probability of a false detection. That is, noise or interference may be spread in the same way as the target reflection in one of the dimensions, but as the number of dimensions of the spread function that are considered together increase, the likelihood of noise or interference spreading in the same way (and thus increasing the chance of false detection) is significantly lowered. In accordance with exemplary embodiments of the invention, systems and methods described herein perform object detection based on considering all the dimensions of the spread function together.

FIG. 1 is a block diagram of a target detection system 100 according to an embodiment of the invention. The exemplary target detection system 100 shown in FIG. 1 may be in a vehicle (different than the target 130), for example. The target detection system 100 may instead be part of a stationary system. A radio detection and ranging (radar) system 110 emits radio waves and receives reflection signals resulting from the emitted radio waves. The radar system 110 includes transmission and receiver subsystems that may share an antenna 105 (in a transceiver arrangement), as shown in FIG. 1, or have dedicated antennas. In the exemplary arrangement shown in FIG. 1, the radar system 110 receives reflection signals from a target 130 or, specifically, from multiple reflection points 135 of the target 130. The reflection signal from each reflection point 135 is characterized in multiple dimensions such as range, azimuth, elevation, intensity, and Doppler components. Thus, each reflection signal is said to be a multi-dimensional (e.g., five-dimensional) spread function. The set of reflection signals from the reflection points 135 (the radar echo) makes up a cluster of spread functions or a superposition of the individual spread functions from each of the reflection points 135. The radar system 110 provides the received cluster of spread functions to a processing system 120 for detection (identification) of the target 130. The embodiments discussed herein apply to reflections from any radar system 110 that are represented by a multi-dimensional spread function. In an exemplary embodiment, the radar system 110 is an imaging radar that may be part of an automotive system, for example, for enhanced safety through obstacle identification or self-driving applications.

The processing system 120, as shown in FIG. 1, includes an input interface 123, one or more processors 125, one or more memory devices 127, and an output interface 129 that may all communicate with each other via a bus 126. In alternate embodiments, the processing system 120 may be implemented as an application specific integrated circuit (ASIC), an electronic circuit, a processor (shared, dedicated, or group) and memory that executes one or more software or firmware programs, a combinational logic circuit, and/or other suitable components that provide the described functionality. The processing system 120 may housed within the radar system 110 instead of being separate, as shown in the exemplary embodiment of FIG. 1. According to embodiments described below, the processing system 120 processes echoes received by the radar system 110 to obtain point spread functions associated with each reflection point 135 and perform object detection on the cluster of echoes. The processing system 120 may implement a maximum likelihood estimator, for example, to perform the object detection. The processing system 120 uses at least three dimensions of each point spread function in the object detection process to increase accuracy and decrease false detections.

Figure 2:
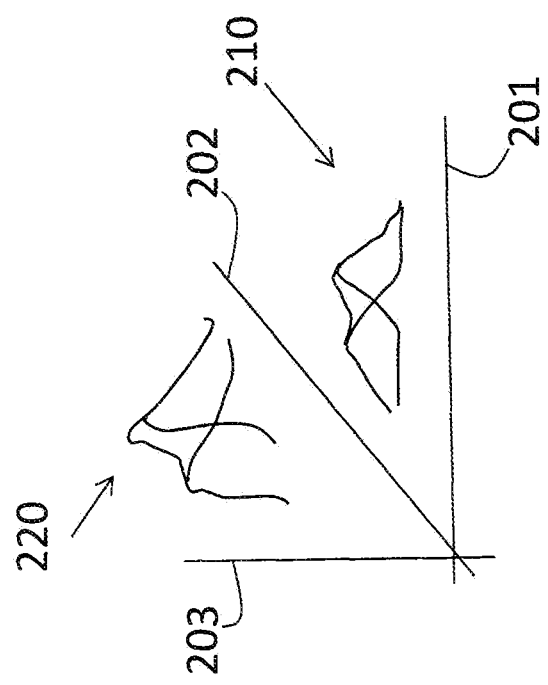
FIG. 2 illustrates the reflections obtained by the radar system in two dimensions.

FIG. 2 illustrates the reflections obtained by the radar system 110 in two dimensions. Azimuth is shown along axis 201, range is shown along axis 202, and intensity is shown along axis 203. Azimuth versus intensity is plotted as 210 from the reflections, and range versus intensity is plotted as 220 from the reflections. Conventional detection systems consider the reflections in two dimensions at a time, as shown in FIG. 2. When plot 210 is used to identify an object, a given subset of possible objects may be potential matches for the target 130 from which the reflections were obtained. When plot 220 is used to identify the target 130, a different subset of possible objects may be potential matches. The inventors realized that considering the spread function in azimuth 201, range 202, and intensity 203 all together would narrow the potential matches beyond those obtained with either plot 210, 220 alone. As the number of dimensions considered together increase, the potential matches narrow further, and the possibility of false detection decreases further.

Figure 3:
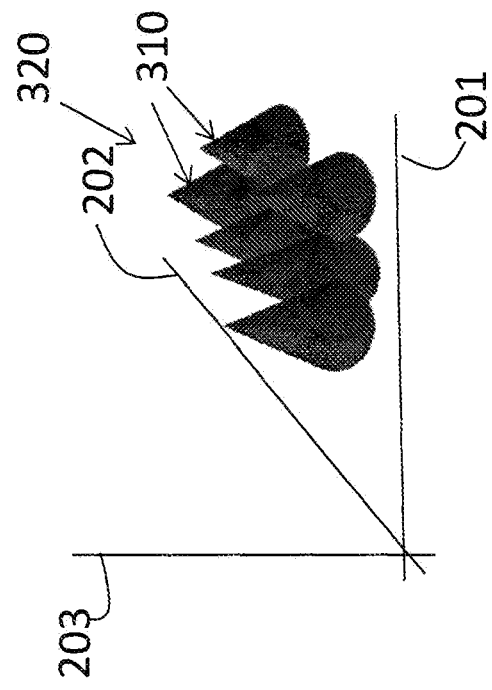
FIG. 3 illustrates the reflections obtained by the radar system in three dimensions according to embodiments of the invention.

FIG. 3 illustrates the reflections obtained by the radar system 110 in three dimensions according to embodiments of the invention. Each cone 310 of the cluster 320 of cones represents a point spread function resulting from one reflection point 135 of the target 130. Each spread function illustrated by a cone 310 in FIG. 3 indicates azimuth (on the axis 201), range (on the axis 202), and intensity (on the axis 203). The cluster 320 is comprised of a random superposition of individual point spread functions (cones 310), which result from processing the received echoes and, specifically, are based on a correlation with the transmit signal in the receiver of the radar system 110. Although three dimensions of the point spread function are shown, all five dimensions (range, azimuth, elevation, intensity, and Doppler) could be considered together in the object detection process. The computational complexity increases as more dimensions are considered together. However, as the inventors noted, the consideration of the interrelation among the dimensions increases the ability to further constrain the possible matches and leads to increased accuracy (decreased false detections) in object detection or identification of the target based on the radar echoes.

Figure 4:
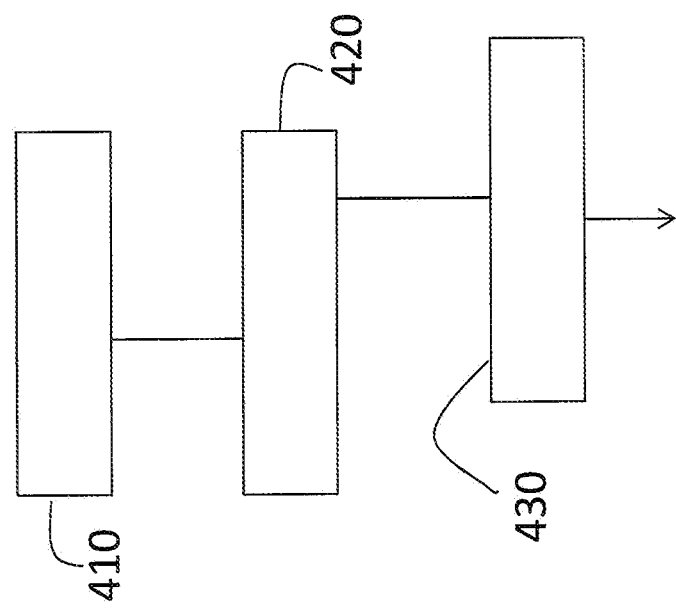
FIG. 4 is a process flow of a method of detecting a target according to an embodiment of the invention.

FIG. 4 is a process flow of a method of detecting a target according to an embodiment of the invention. At block 410, obtaining radar echoes from the target 130 with multiple point scatters (reflection points 135) includes using the radar system 110. Obtaining a cluster 320 of point spread functions (see e.g., cones 310) of all received parameters, at block 420, refers to the multi-dimensional point spread functions. The processing system 120 obtains the multi-dimensional point spread functions to perform object detection, at block 430, to identify the target. As noted above, the more dimensions of the multi-dimensional point spread functions that are used in the object detection, the more constrained the detection process becomes, and the fewer false detections that result. An exemplary object detection technique implemented by the processing system 120 is maximum likelihood estimator for the distributed target 130 reflections. For example, with $\Omega$ representing a cluster of five-dimensional reflection points 135 (range, azimuth, elevation, Doppler, intensity) associated with the same target 130 (a set of scattering centers to be estimated), and Y representing echoes received by the radar system 110, the maximum likelihood estimation of the cluster of reflection points 135 of the target 130 is given by:

$$\hat{\Omega} = \arg\max_{\Omega} f(Y|\Omega) \quad\quad [\text{EQ. 1}]$$

The function is a probability distribution function (PDF), which is a function of the five-dimensional point spread function (e.g., correlated Gaussian distribution).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A target detection system, comprising:
   a radar system configured to obtain radar echoes from a target with multiple point reflectors; and
   a processor configured to obtain a cluster of multi-dimensional point spread function from the radar echoes, each multi-dimensional point spread function being associated with a reflection from one of the multiple point reflectors, and also configured to perform object detection based on three or more dimensions of each of the multi-dimensional point spread functions of the cluster.

2. The system according to claim 1, wherein each multi-dimensional point spread function includes five dimensions and the five dimensions include range, azimuth, elevation, intensity, and Doppler.

3. The system according to claim 2, wherein the processor performs object detection based on the five dimensions.

4. The system according to claim 1, wherein the processor performs object detection based on performing maximum likelihood estimation using the three or more dimensions of each of the multi-dimensional point spread functions.

5. The system according to claim 4, wherein the processor performs the maximum likelihood estimation as:

$$\hat{\Omega}=\arg\max_{\Omega} f(Y|\Omega),$$

wherein
   $\Omega$ is the multiple point reflectors, Y is the radar echoes, and the function is a probability distribution function.

6. A method of performing radar target detection, the method comprising:
   obtaining, using a radar system, radar echoes from a target with multiple point reflectors;
   obtaining, using a processor, a cluster of multi-dimensional point spread functions from the radar echoes, each multi-dimensional point spread function being associated with a reflection from one of the multiple point reflectors;
   performing object detection, using the processor, based on three or more dimensions of each of the multi-dimensional point spread functions of the cluster.

7. The method according to claim 6, wherein the obtaining the radar echoes includes disposing the radar system in a vehicle to detect obstacles.

8. The method according to claim 6, wherein the obtaining the cluster of multi-dimensional point spread functions includes obtaining a cluster of five-dimensional point spread functions.

9. The method according to claim 8, wherein the obtaining the cluster of five-dimensional point spread functions includes obtaining spreads in five dimensions including range, azimuth, elevation, intensity, and Doppler.

10. The method according to claim 9, wherein the performing object detection is based on the five dimensions.

11. The method according to claim 6, wherein the performing object detection is based on performing maximum likelihood estimation using the three or more dimensions of each of the multi-dimensional point spread functions.

12. The method according to claim 11, wherein the performing the maximum likelihood estimation is as:

$$\hat{\Omega}=\arg\max_{\Omega} f(Y|\Omega),$$

wherein
   $\Omega$ is the multiple point reflectors, Y is the radar echoes, and the function is a probability distribution function.

* * * * *